March 21, 1939.  W. L. McGRATH  2,151,042

ENGINE STARTER GEARING

Filed May 27, 1937

Witness:
Burr W. Jones

INVENTOR.
William L. McGrath
BY
ATTORNEY.

Patented Mar. 21, 1939

2,151,042

UNITED STATES PATENT OFFICE 2,151,042

ENGINE STARTER GEARING

William L. McGrath, Elmira, N. Y., assignor, by mesne assignments, to Bendix Aviation Corporation, South Bend, Ind., a corporation of Delaware Application May 27, 1937, Serial No. 145,077

6 Claims. (Cl. 74—8)

The present invention relates to engine starter gearing and more particularly to that type of gearing sometimes referred to as swinging shifts in which the connection of a starting motor to an engine member is controlled by planetary motion of an intermediate member such as a gear or friction wheel.

In swinging shift starters which utilize friction wheels for the driving connection, it becomes necessary to so design the parts that adequate adhesion of the surfaces is provided by the driving reactions, while avoiding unnecessarily high bearing pressures or stresses of the structural parts. In starting devices of this type heretofore developed, this has been somewhat difficult due to the fact that any yielding or lost motion in the gearing tends to change the geometry of the drive and cause wide variations in the resultant forces.

It is an object of the present invention to provide novel starter gearing of the swinging shift type which is efficient and reliable in operation, while being simple and economical in construction.

It is another object to provide such a device incorporating friction gears in which said gears are forced into operative engagement by the reaction of the driving forces.

It is a further object to provide such a device incorporating means for limiting the compression of the friction gears to a predetermined maximum.

It is another object to provide such a device in which the operative position of the friction gearing is positively defined and maintained during cranking of the engine.

Figure 1:
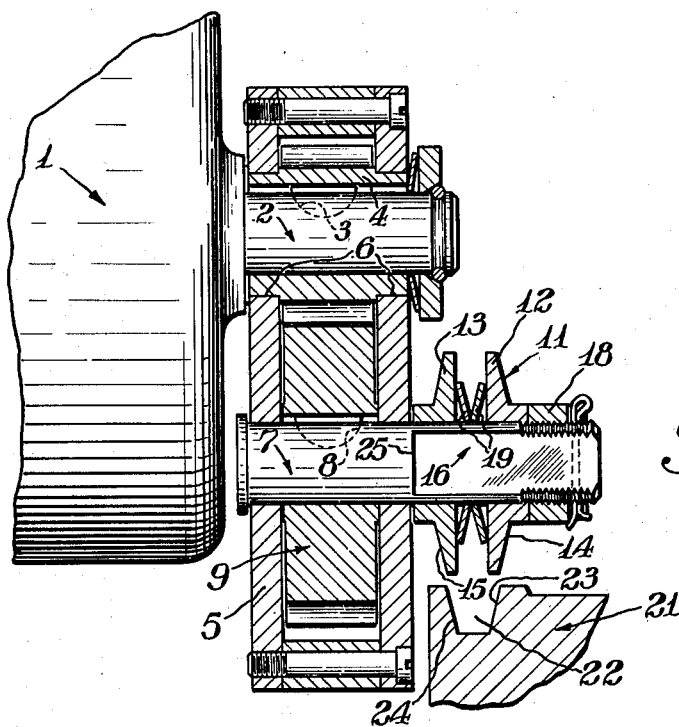
Figure 2:
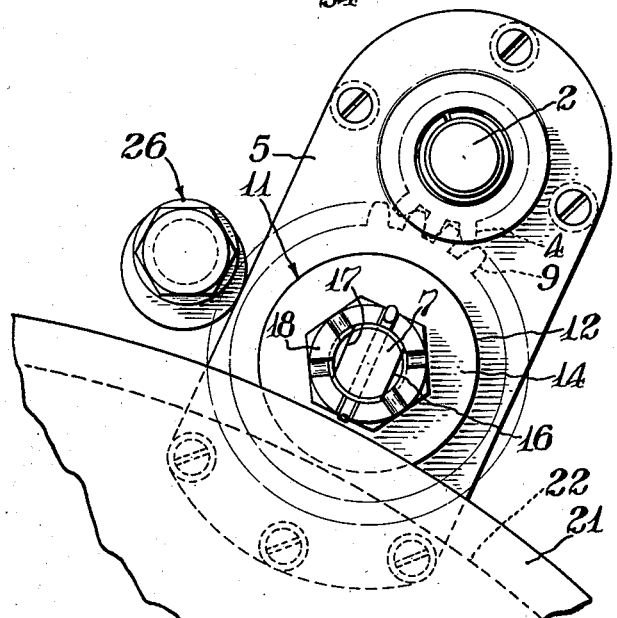

Further objects and advantages will be apparent from the following description taken in connection with the accompanying drawing in which:

Fig. 1 is a side elevation partly in section of a preferred embodiment of the invention; and Fig. 2 is an end view thereof.

Referring first to Fig. 1 of the drawing, there is illustrated a starting motor 1 having an extended armature shaft 2 on which is fixed in any suitable manner as indicated at 3 a driving pinion 4. A swinging bracket 5 is journalled in any suitable manner as indicated at 6 on smooth extended portions of the pinion 4 and has journalled therein an idler shaft 7 having keyed thereon as indicated at 8 an idler gear 9 meshing with the driving pinion 4.

The idler shaft 7 extends laterally from the bracket 5 and has mounted thereon a friction wheel indicated generally by numeral 11 comprising two friction discs 12 and 13 having slightly conical friction surfaces 14 and 15 respectively and slidably but non-rotatably mounted on the idler shaft 7 as by means of corresponding "double-D" sections 16 and 17 on the shaft and discs respectively. The friction discs are maintained on the shaft 7 by suitable abutment means such as an adjustable stop nut 18, and are yieldingly kept in expanded position as by means of springs 19 located therebetween. Springs of the dished washer type illustrated are preferably used for this purpose in view of their substantially flat characteristic curve which ensures substantially uniform expansive force on the discs through wide variations in their relative operative positions.

The swinging movement of the bracket 5 about the motor shaft 2 permits a planetary motion of the friction wheel 11 for the purpose of bringing it into and out of engagement with a member such as a flywheel gear 21 of an engine to be started. As here shown, this flywheel gear is in the form of a friction gear having a groove 22 adapted to receive the friction wheel 11 with flared sides 23 and 24 arranged to be frictionally engaged by the surfaces 14 and 15 of the discs 12, 13. It will be understood that the normal spacing of the discs 12, 13 by the springs 19 is so limited by the stop nut 18 and the shoulder 25 at the end of the "double-D" section of the idler shaft that the edges of the discs 12, 13 enter the outer portion of the groove 22 a short distance before engaging the sides of the groove. Thereafter, further entry of the friction wheel 11 in the groove causes compression of the discs 12, 13 against the action of springs 19.

As shown in Fig. 2, the planetary motion of the idler shaft 7 in the direction to engage the friction wheel 11 with the engine gear 21 is limited by suitable stop means such as indicated at 26 to a position where the axis of the idler shaft is approximately in the common plane of the motor shaft and engine shaft.

In the operation of the device and starting with the parts in the positions shown in Fig. 1, energization of the starting motor 1 causes rotation of the driving pinion 4, the reaction of which on the idler gear 9 causes the bracket 5 to swing in a direction to engage the friction wheel 11 with the engine gear 21. As soon as initial engagement takes place, the driving reaction causes the bracket 5 to swing further, causing the friction wheel to be forced into full engagement with the engine gear as illustrated in Fig. 2. During this engaging movement, the discs 12, 13 of the friction wheel 11 will be compressed by the sides of the groove 22, but inasmuch as such compression is resisted by the springs 19 with a substantially constant force, the pressure of the friction surfaces of the wheel and gear will be substantially constant and of a magnitude predetermined by the strength of the springs 19.

When the bracket 5 encounters the stop 26, further rotation of the starting motor causes the flywheel to be rotated by the friction wheel 11 and the engine thereby cranked. When the engine starts, the overrunning action of the engine gear 21 causes the friction wheel 11 to be thrown back out of engagement therewith and into its idle position.

It will be appreciated that there is here provided a device in which a substantially constant frictional driving effect is secured irrespective of wide variations in the positioning and dimensions of the parts and without imposing unnecessary stresses on the bearings or other parts of the device.

Although but one embodiment of the invention has been shown and described in detail, it will be understood that other embodiments are possible and various changes may be made in the proportions and arrangements of the parts without departing from the spirit of the invention as defined in the claims appended hereto.

What is claimed is:

1. Engine starter gearing including a friction wheel mounted for lateral motion into and out of engagement with a member of an engine to be started, means for rotating said wheel and for forcing it into engagement with the engine member by the reaction of the cranking load transmitted therethrough, means for limiting the engaging movement of the wheel, and means for maintaining a substantially constant pressure between the engaging surfaces of the wheel and gear when the gear is in operative position, irrespective of variations in load or operating clearances.

2. Engine starter gearing including a power shaft, a friction wheel driven therefrom and mounted for planetary movement thereabout into engagement with a member of an engine to be started by the reaction of the cranking load transmitted therethrough, means for preventing such planetary movement beyond the plane including the axis of planetation and the axis of rotation of the engine member, and yielding means maintaining substantially constant the frictional engagement of the wheel and engine member when the gear is in operative position, irrespective of variations in load or operating clearances.

3. In an engine starter, a power shaft, a friction gear driven thereby and mounted for planetary movement thereabout, a peripherally grooved friction gear operatively connected to an engine to be started, adapted to be engaged and rotated by the planetary gear, said planetary gear having tapered flanges adapted to engage the sides of the groove in the engine member and to be compressed when forced into engagement therewith by the reaction of the cranking load transmitted therethrough, means for limiting the engaging movement of the planetary gear, and means for yieldingly resisting compression of said flanges to maintain substantially constant the engaging pressure of the friction gears.

4. In an engine starter, a motor shaft, a pinion fixed thereon, an idler shaft mounted parallel to the motor shaft and movable laterally with respect thereto, a gear fixed on the idler shaft meshing with said pinion, a pair of tapered friction discs slidably but non-rotatably mounted on the idler shaft, a rotatable engine member having a flared annular groove adapted to receive the edges of said discs, means limiting the engaging movement of the discs with the engine member, and spring means opposing compression of said discs by entry into the groove.

5. In an engine starter, a rotary engine member having a flared peripheral groove, a power shaft, a pair of conical friction members driven thereby and mounted for limited relative longitudinal movement and for bodily movement transverse to their axis of rotation into and out of engagement with the groove of the engine member, yielding means resisting longitudinal movement of the friction members toward each other due to their entry in said groove, and means for limiting the engaging movement of the friction members.

6. In an engine starter, a rotary engine member having a flared peripheral groove, a power shaft, friction gearing for rotating the engine member from the power shaft including a pair of conical friction members driven by the power shaft and mounted for limited relative longitudinal movement and for bodily movement transverse to their axis of rotation into and out of engagement with the groove of the engine member, a spring of substantially constant expansive force normally holding said friction members axially spaced so as to be compressed by entry into said groove, and means extraneous to the friction gearing for limiting the engaging movement of the friction members.

WILLIAM L. McGRATH.